Jan. 21, 1941.  C. N. TURLEY  2,229,595
SAFETY BRAKE DRAFT GEAR
Filed May 16, 1940  2 Sheets-Sheet 2

Inventor
C. N. Turley
By [signature]
Attorney

Patented Jan. 21, 1941

2,229,595

UNITED STATES PATENT OFFICE 2,229,595

SAFETY BRAKE DRAFT GEAR

Claude N. Turley, Bedford, Ind.

Application May 16, 1940, Serial No. 335,640

1 Claim. (Cl. 188—58)

This invention relates to a safety brake draft gear and it aims to provide a novel construction which is operable from an air reservoir.

It is particularly aimed to provide such a construction as will prevent undue wear of the wheels by the brake shoes and provision of sharp flanges on the wheels; one in which the shoes are located advantageously to prevent displacement beneath the wheels and consequent wrecking of trains equipped with the brakes, and a construction wherein the brake shoes are more advantageously located so as to remain dry.

Further, objects are to provide a structure wherein greater braking power is attained and the equipment is more durable.

The more specific objects and advantages will become apparent from a consideration of the description following taken in connection with accompanying drawings illustrating an operative embodiment.

In said drawings:

Figure 4 is a perspective view of a portion of one of the axles and brake-engaging enlargement, and Figure 5 is a perspective view illustrating one of the brake shoes.

Figure 1:
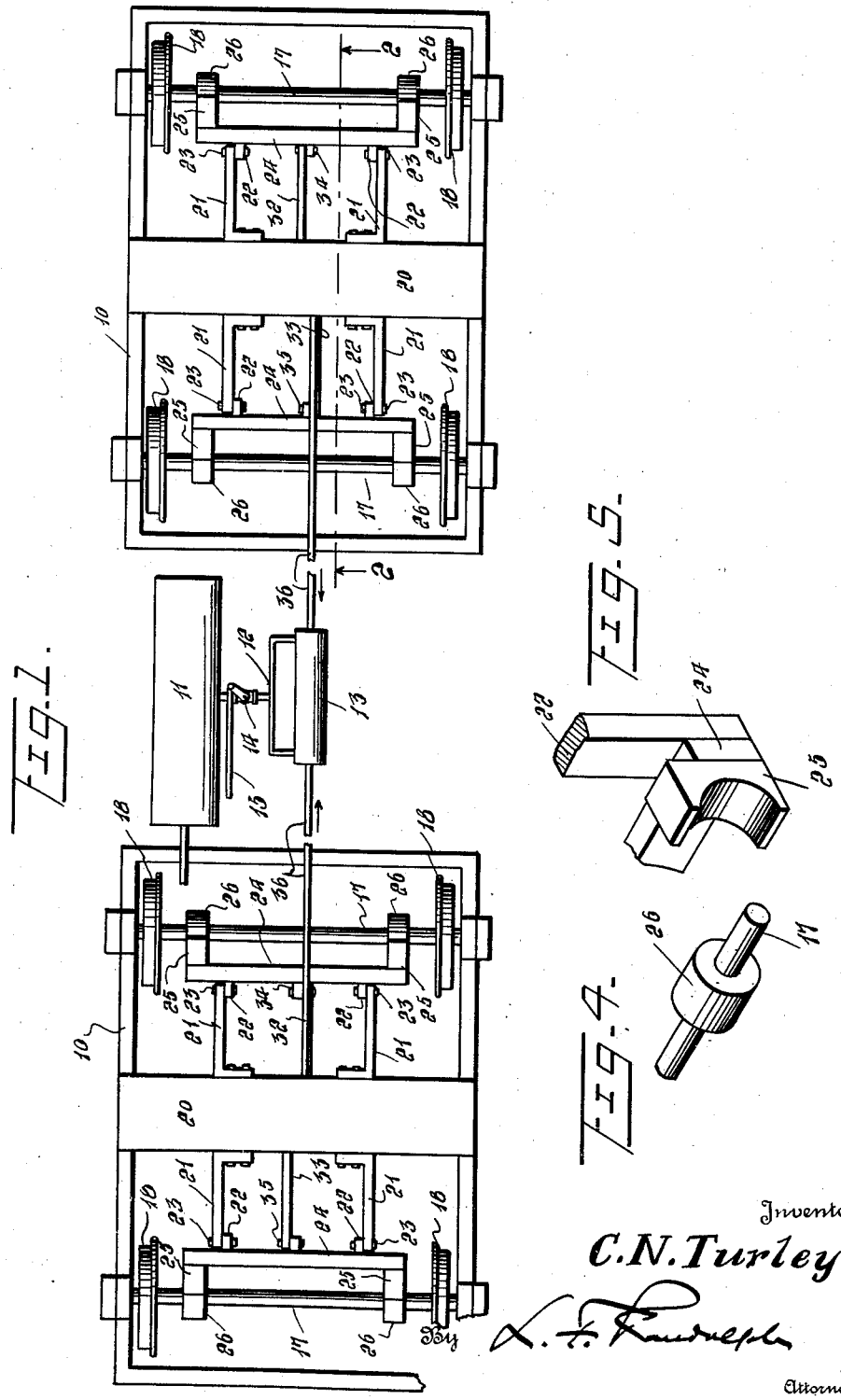
Figure 1 is a view of under-structure of a railway car equipped with my improved brake gear.
Figure 2:
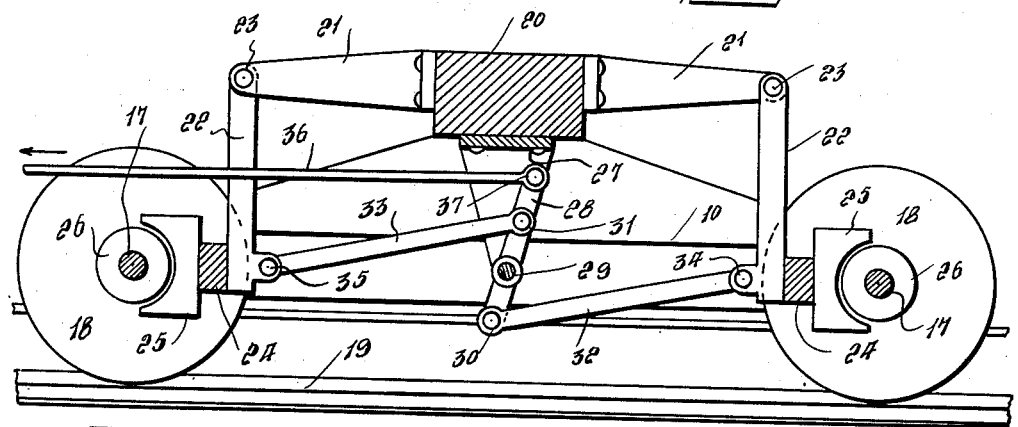
Figure 2 is a vertical sectional view on an enlarged scale, taken on the plane of line 2—2 of Figure 1.
Figure 3:
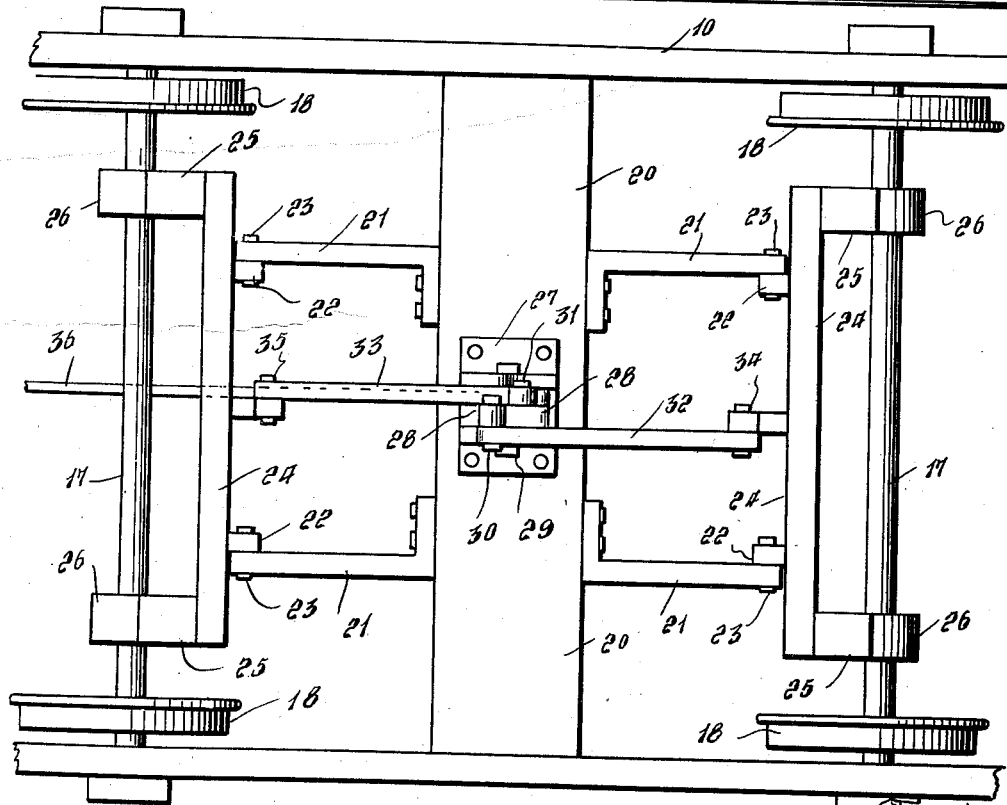
Figure 3 is an enlarged inverted plan view of the parts of Figure 3.

Referring specifically to the drawings wherein like reference characters designate like or similar parts, the improved safety brake draft gear is primarily adapted for use on railway trains and is shown in connection with a pair of trucks 10 of conventional construction from which the body of the car is supported and which body also carries a brake cylinder or reservoir 11 for compressed air communicating through piping at 12 with opposite ends of an auxiliary cylinder 13, the pipe 12 having a valve 14 therein operable from any suitable location on the car through linkage 15, to either cut-off the supply or flow of air to or from the pipe 12 or direct the compressed air from the reservoir 11 to either end of the auxiliary cylinder 13 so that any suitable piston means therein will move the rods 36 toward each other or move them apart to apply and release the brakes, respectively.

On the trucks 10, axles 17 are journaled equipped with usual wheels 18 which travel on usual rails at 19.

Each truck 10 and parts mounted thereon are similar. Such trucks have beams 20 from opposite sides of which brackets 21 project and to which hangers 22 are pivoted at 23 and at their lower ends are connected by brake beams 24 transversely disposed in parallelism to the axles 17, and carrying suitable brake shoes 25, which are engageable with enlargements or braking surfaces 26 provided on the axles 17.

A bracket 27 depends from each beam 20 and a lever 28 is pivoted thereto on a horizontal axis at 29. Pivoted at 30 and 31, on opposite sides of the axes 29 and to the lever 28, are links 32 and 33, respectively, which are pivoted at 34 and 36, respectively, to the brake beams 24.

Control rods 36 extend from opposite ends of the piston 16 through the ends of the cylinder 13 and are connected pivotally as at 37, to the upper ends of the levers 28.

Normally, the brake shoes 25 will be in the released position shown in the drawings. However, the valve 14 is readily operable so that compressed air will be admitted from the reservoir 11 into the auxiliary reservoir 13 at one end thereof, to move the piston 16 and thereby draw the rods 36 toward each other in order to apply the brake shoes 25, such valve 14 also being operable to release such compressed air from the cylinder 13, thereby enabling the brake shoes to automatically return to the normal or released position shown.

It will be realized that the zone of application of the brakes is at a distance from the wheels and inwardly thereof whereby the same are protected against weather conditions and will not cause wear and consequent sharpening of the flanges of the wheels 18.

Various changes may be resorted to provided they fall within the spirit and scope of the invention.

I claim as my invention:

In a brake mechanism mounted on a car truck having wheels carried by parallel axles and journaled on the truck, a pair of enlargements on each axle between the wheels and of less diameter than the wheels, a beam on the truck above the wheels, vertical hangers pivotally suspended from the beam, brake beams parallel to the axles connecting pairs of the hangers at the lower ends of the latter, a pair of shoes carried by each brake beam in position to coact with the adjacent enlargements, a lever below the truck beam, means depending from the truck beam and pivotally mounting said lever, links pivotally connected to the lever on opposite sides of its fulcrum, said links being pivotally connected, respectively, to the brake beams, means operable to swing the lever to apply the brake shoes, said means being connected to the lever above the links and beneath the truck beam, and extending over one axle between adjacent hangers, the brackets extending from opposite sides of the truck beam, and said hangers being pivotally connected directly to said brackets.

CLAUDE N. $\overset{\text{his}}{\times}$ TURLEY.
mark